(12) United States Patent
Liu et al.

(10) Patent No.: US 10,467,603 B2
(45) Date of Patent: Nov. 5, 2019

(54) ONLINE PAYMENT PROCESSING METHOD, APPARATUS AND SYSTEM

(71) Applicant: Tencent Technology (Shenzhen) Company Limited, Shenzhen (CN)

(72) Inventors: Zhao Liu, Shenzhen (CN); Ge Liu, Shenzhen (CN); Xiongwei Peng, Shenzhen (CN); Yuheng Xie, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 503 days.

(21) Appl. No.: 15/000,518

(22) Filed: Jan. 19, 2016

(65) Prior Publication Data

US 2016/0132846 A1     May 12, 2016

Related U.S. Application Data

(63) Continuation of application No. PCT/CN2014/089707, filed on Oct. 28, 2014.

(30) Foreign Application Priority Data

Oct. 28, 2013   (CN) .......................... 2013 1 0518396

(51) Int. Cl.
  *G06Q 20/10*   (2012.01)
  *G06Q 20/02*   (2012.01)
  *G06Q 20/42*   (2012.01)

(52) U.S. Cl.
  CPC ......... *G06Q 20/102* (2013.01); *G06Q 20/027* (2013.01); *G06Q 20/42* (2013.01)

(58) Field of Classification Search
  CPC .................................................... G06Q 20/102
  (Continued)

(56) References Cited

U.S. PATENT DOCUMENTS 7,742,983 B2    6/2010 Ukigawa et al.
9,710,807 B2 *  7/2017 Theurer ................. G06Q 20/36
(Continued)

FOREIGN PATENT DOCUMENTS

CN       102483825 A    5/2012
CN       103020818 A    4/2013
(Continued)

OTHER PUBLICATIONS

Verified by Visa Acquirer and Merchant Implementation Guide US Region (Year: 2011).*

(Continued)

*Primary Examiner* — Bruce I Ebersman
(74) *Attorney, Agent, or Firm* — Morgan, Lewis & Bockius LLP

(57) ABSTRACT

An online payment processing method, apparatus and system provide a simpler and less expensive online fund payment processing process. The method includes: sending a payment processing request from a merchant client to a payment request receiving server, the payment processing request carrying payment information; sending a uniform resource locator (URL) request to an open platform; processing payment by the open platform server based on the payment information obtained from the payment request receiving server and user information obtained from a user through a user client.

7 Claims, 13 Drawing Sheets

(58) Field of Classification Search
USPC .......................................................... 705/39
See application file for complete search history.

(56) References Cited

U.S. PATENT DOCUMENTS

| | | | |
|---|---|---|---|
| 9,864,993 B2* | 1/2018 | Weller | G06Q 20/02 |
| 10,121,129 B2* | 11/2018 | Kalgi | G06Q 20/12 |
| 10,223,691 B2* | 3/2019 | Katzin | G06Q 20/204 |
| 10,223,710 B2* | 3/2019 | Purves | G06Q 20/32 |
| 2010/0241571 A1 | 9/2010 | McDonald | |
| 2013/0159154 A1* | 6/2013 | Purves | G06Q 20/36 |
| | | | 705/35 |
| 2013/0346302 A1* | 12/2013 | Purves | G06Q 20/102 |
| | | | 705/40 |
| 2015/0371334 A1* | 12/2015 | Ko | G06Q 40/06 |
| | | | 705/36 R |

FOREIGN PATENT DOCUMENTS

| | | |
|---|---|---|
| CN | 103268550 A | 8/2013 |
| WO | WO 2010/105331 A1 | 9/2010 |

OTHER PUBLICATIONS

Office Action to Taiwan Application No. 103126922 dated Aug. 11, 2015 and concise explanation in English (14 pgs.).
International Search Report and Written Opinion corresponding to PCT/CN2014/089707 dated Jan. 28, 2015.

* cited by examiner

ONLINE PAYMENT PROCESSING METHOD, APPARATUS AND SYSTEM

CROSS-REFERENCE TO RELATED APPLICATIONS

The present application is a continuation application of PCT/CN2014/089707, filed Oct. 28, 2014, which claims priority to CN 201310518396.4, filed Oct. 28, 2013. The contents of these applications are incorporated herein by reference in their entirety.

TECHNICAL FILED

The present disclosure relates to Internet technologies, and in particular, to online payment processing methods, apparatuses and systems thereof.

BACKGROUND

The statements in this section merely provide background information related to the present disclosure and may not constitute prior art.

Consumers may purchase goods or services through a variety of channels, including shopping in stores, by phones or via the Internet. The consumers may swipe their cards at merchant's point of sale (POS) devices in the stores, make a payment upon delivery, or provide credit card numbers or bank card numbers for order by phone or over the Internet.

For the payment upon delivery situations, the merchants need to provide a lot of POS devices for couriers to allow the consumers to swipe their cards to make a payment, thereby increasing merchants' business costs. For online payment situations, the merchants may communicate with the consumers through an open platform such as WeChat (also known as "Weixin"). A merchant needs to have an account on the open platform and develop a series of interface protocols in order to communicate with the open platform, which processes the payment. For authentication purposes, the merchant also need to have its own website and backend server to store the authentication key provided by the open platform. The above-described online payment method is cost-prohibitive for small and mid-sized merchants due to lack of resources to develop their own websites and the required interface protocols to communicate with the open platform.

Moreover, regardless of the type of purchases and the methods of payment, the consumers generally need to have their bank cards or credit cards in hand to make a payment. Carrying multiple credit cards and/or bank cards during shopping or dining increases the risk of identity theft when the consumers lose their wallets.

SUMMARY

The present invention provides a simple, less expensive, and cardless online payment processing method, apparatus and system thereof.

An embodiment of the present invention provides an online payment processing method, which is implemented by using a payment request receiving server and an open platform server. The payment request receiving server is an independent network side server to support a payment request receiving application installed on a merchant client. The open platform server may be a Social Networking Services (SNS) server or an open platform server. The user is a registered user of the open platform. The merchant client communicates directly with the payment request receiving server, and a user client communicates directly with the open platform server. The communication between the merchant client and the user client is achieved through the payment request receiving server, the payment request receiving application installed on the merchant client, and the open platform server, so that the merchant can perform online payment processing on mobile devices, such as, smart phones, iPhones, iPads, and tablets without establishing any interface protocols, which are generally required in a typical online processing method using an open platform (server) for payment processing.

In one form, an online payment processing method according to the present disclosure includes sending a payment processing request from a merchant client to a payment request receiving server, the payment processing request carrying payment information; sending a uniform resource locator (URL) request from the payment receiving server to an open platform; processing payment by the open platform server based on the payment information obtained from the payment request receiving server and user information obtained from a user through a user client.

In another form, an online payment processing method including: installing a payment request receiving application on a merchant client; performing communication between the merchant client and a payment request receiving server via the payment request receiving application; opening a user account by a user at an open platform server; communicating between the merchant client and the open platform server by the payment request receiving application and the payment request receiving server; and processing a payment by the open platform server based on payment information obtained from the payment request receiving server and user information obtained from the user via a user client.

In still another form, an online payment processing apparatus, comprising: an input/output circuit for receiving a payment processing request sent by a merchant client; a processor for generating payment information based on the payment processing request received by the input/output circuit, wherein the input/output circuit is further used for sending the payment information generated by the processor to the merchant client; and a payment processing module for receiving a fund deposited by the open platform server, and further used for transferring the received fund to a merchant fund account.

BRIEF DESCRIPTION OF THE DRAWINGS

The drawings described herein are for illustration purposes only and are not intended to limit the scope of the present disclosure in any way.

In order that the invention may be well understood, there will now be described an embodiment thereof, given by way of example, reference being made to the accompanying drawing, in which.

DETAILED DESCRIPTION

The following description is merely exemplary in nature and is not intended to limit the present disclosure, application, or uses.

Figure 1:
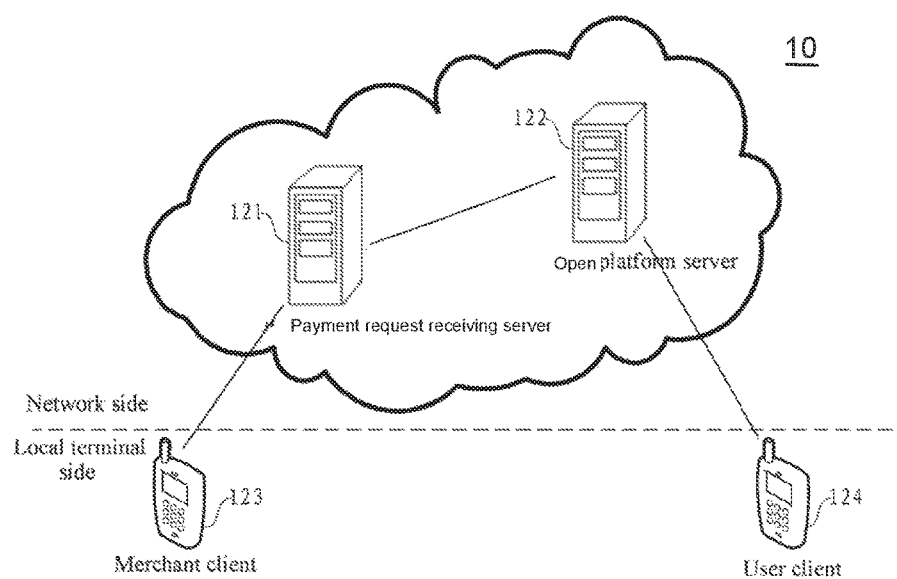
FIG. 1 is a schematic view of an online payment processing system according to an embodiment of the present invention.

Referring to FIG. 1, an online payment processing system 10 in accordance with the teachings of the present disclosure includes a payment request receiving server 121, an open platform server 122, a merchant client 123 (or a merchant terminal), and a user client 124 (or a user terminal). The merchant client 123 communicates with the user client 124 through the payment request receiving server 121 and the open platform server 122. Both the payment request receiving server 121 and the open platform server 122 are on the network side. The merchant client 123 is a terminal of a merchant and is in direct communication with the payment request receiving server 121 through a payment request receiving application 125 (shown in FIG. 2) installed on the merchant client 123. The payment request receiving server 121 is a backend server of the platform established by the payment request receiving application 125. The user client 124 is the terminal of a user or a consumer and is in direct communication with the open platform server 122. The open platform server 122 is a backend server of an open platform, which may be Social Networking Services (SNS), such as WeChat (also known as "WeiXin"), or any known payment platforms, such as PayPal. It is understood that any open platform or payment platform can be used to implement the online payment processing method according to the present disclosure. The merchant client 123 and the user client 124 may be any devices that can be connected to the Internet, such as mobile phones, iPads, iPhone, tablets, computers etc. The merchant client 123 and the user client 124 may be of the same or different types of devices.

Figure 2:
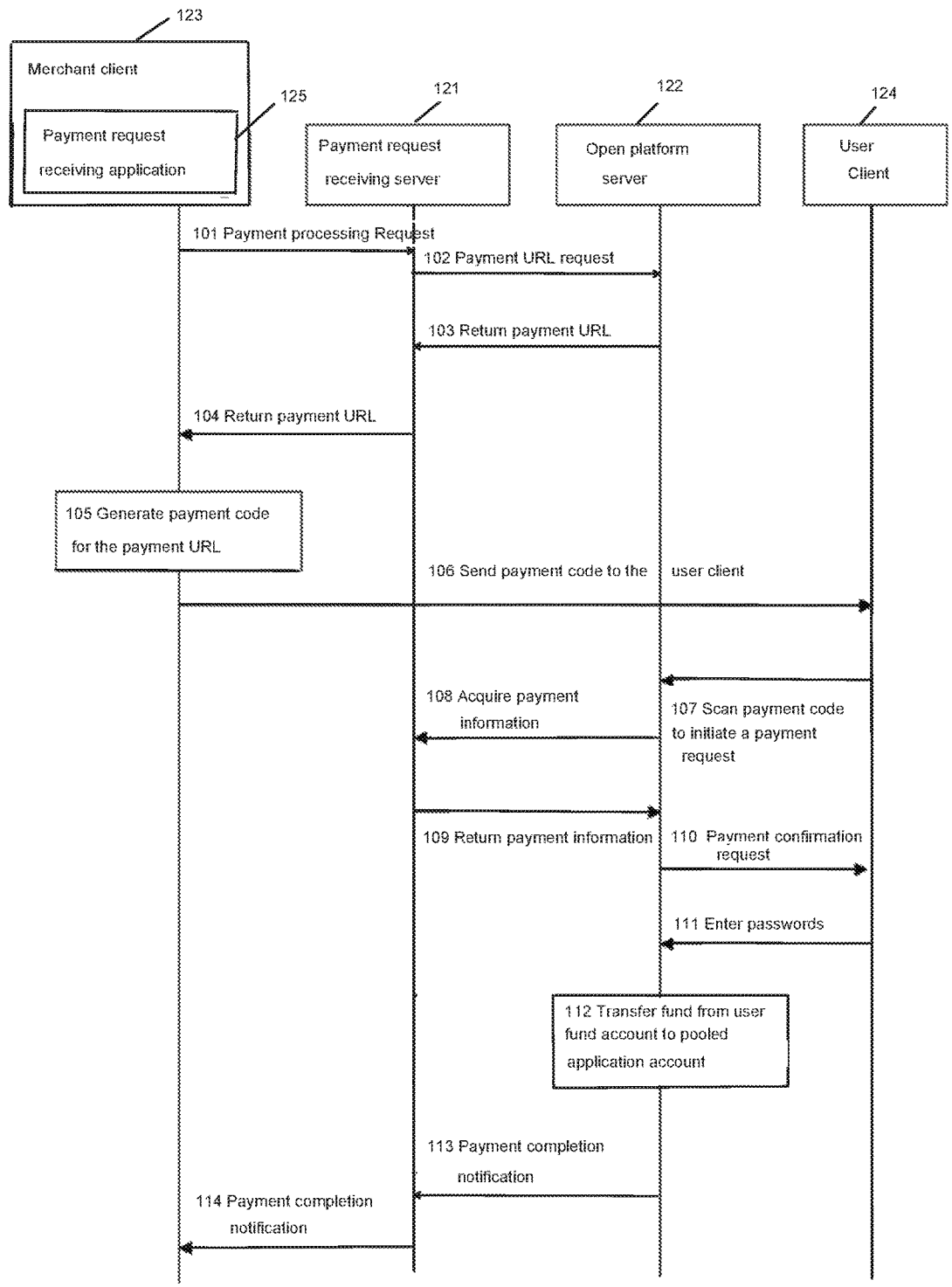
FIG. 2 is a schematic diagram of the online payment processing system showing the interaction/communication among a merchant client, a user client, a payment request receiving server, and an open platform server according to an embodiment of the present invention.

Referring to FIG. 2, the interaction/communication among the payment request receiving server 121, the open platform server 122, the merchant client 123 and the user client 124 is described in more detail below.

The merchant client 123 needs to have a payment request receiving application 125 installed and run on the merchant client 123 in order to communicate with the payment request receiving server 121. When a user is ready to make a payment in a merchant's store or restaurant, the merchant may use a mobile device, such as smart phone, iPhone, tablet, iPad, among others, as a merchant client 123, to send a payment processing request to the payment request receiving server 121 in step 101.

Before the merchant client 123 sends the payment processing request to the payment request receiving server in step 101, the payment request receiving server 123 may send a URL for a webpage including an information input interface to the merchant client 123 when the merchant client 123 open the application page. Therefore, the merchant can enter the payment information (such as description of goods or services) and payment amount so that the payment information and the payment amount can be included in the payment processing request from the merchant client 123 to the payment processing receiving server 121.

The payment processing request may include payment information and merchant information. The payment information may include, but not be limited to, an amount of payment, description of a commodity (goods or services), a commodity identifier (e.g., commodity reference number). The merchant information may include, but not be limited to, a merchant ID and a merchant account ID (e.g., account ID on the platform established by the payment request receiving application). The merchant ID may be codes or signs that can identify the merchant.

The payment processing request may or may not include the information about the merchant ID. The merchant ID may have been saved at a backend server (not shown) of the payment request receiving server 121 when the merchant registers and open a merchant account with the payment request receiving server 121 through the payment request receiving application 125. Therefore, the payment request receiving server can simply retrieve the merchant ID from its backend server without the merchant client 123 including the merchant ID in the payment processing request to the payment request receiving server 121.

The payment information may or may not include description of the goods or services. When the consumers purchase a good, service or food in person in stores or restaurants, the consumers have physically examined or enjoyed the services or food. Therefore, the description of the goods or serves is optional. Alternatively, after the merchant opens an application account at the payment request receiving server 121, the merchant may periodically upload payment information, such as the description of commodities (goods or services), their prices, commodities ID, discounts, bonus points, identifiers, etc. to the payment request receiving server 121. Therefore, a commodity ID carried in the payment processing request will allow the payment request receiving server 121 to retrieve the description and prices of the goods or serves associated with the commodity ID from its backend server.

Upon receipt of the payment processing request from the merchant client 123, the payment request receiving server 121 sends a payment URL (Uniform Resource Locator) request that carries payment information to the open platform server 122 in step 102. The open platform server 122 then returns to the payment request receiving server 121 a payment URL (i.e., a web address) linked to a webpage that includes the payment information and merchant information in step 103. The payment request receiving server 121 then returns the payment URL to the merchant client 123 in step 104.

After the merchant client 123 receives the payment link in step 104, the merchant client 123 then generates locally a payment code in the form of a two-dimensional bar code, or a quick response code ("QR code") for the payment URL in step 105. While a two-dimensional bar code is used as the payment code in the present disclosure, it is understood that codes other than the two-dimensional bar codes may be used as long as the codes can be used to identify a URL in the open platform server 122 to locate the payment information and merchant information.

After generating the payment code, the merchant client 123 sends the payment code to the user client 124 in step 106. The payment code may be sent from the merchant client 123 to the user client 124 by using a user's mobile device to scan the payment code displayed on the merchant client 123 during a face-to-face transaction. The user client 124 may scan the payment ID by using a built-in browser of the user client 124 or a code reader installed in the user client 124. Therefore, the user client 124 may be linked by the URL to a web page that includes payment information.

In an online shopping situation, the merchant client 123 may send the payment code or the URL via email to the user client 124 such that the user client 124 can obtain the URL and open the webpage relating the payment information.

When the user client 124 obtains the payment code from the merchant client 123 by scanning, the operation of scanning also triggers a payment request from the user client 124 to the open platform 122 in step 107. Upon receipt of the payment request from the user client 124, the open platform server 122 sends a payment information acquiring request to the payment request receiving server 121 in step 108. In response, the payment request receiving server 121 sends a payment information response to the open platform 122 in step 109.

Upon receipt of the payment information from the payment request receiving server 121, the open platform server 122 sends a payment confirmation request to the user client 124 in step 110. The payment confirmation request includes the user information and the payment information, such as the payment amount and the description of the goods or services. The payment information is obtained from the payment request receiving server 121. The user information may be obtained directly from the user client 124 or alternatively, from a backend server of the open platform server 122. The user information is obtained and saved in the backend server of the open platform server 122 when the user registers and opens an account at the open platform server 122. The user information in this embodiment includes, but is not limited to, a user ID, a user password, and a user fund account number. Therefore, after obtaining the payment information from the payment request receiving server 121 and the user information from the backend server of the open platform server 122, the open platform server 122 then generates and sends a payment confirmation page to the user client 124.

The user then reviews and confirms the payment information and the user information on the payment confirmation page. When the user performs a confirm operation, the user client 124 sends a payment confirmation response to the open platform server in step 111.

In one form, the payment confirmation page sent from the open platform server 122 to the user client 124 may include password input interface to prompt the user to enter passwords for a user fund account, in addition to the payment information. Therefore, the user can enter passwords for the user fund account to confirm and the user client 124 sends a confirmation response to the open platform server 122. In other words, the open platform server 122 may send a request to the user client 124 requesting confirmation of the payment information and authentication of the user's identify simultaneously by displaying both the payment information and the passwords entry interface on the same page. By entering the passwords, the user can confirm the payment information and authenticate his or her identify in one step as shown in step 111 of FIG. 2.

In another form, the open platform server 122 may send a payment confirmation page to the user client 124 first. The user client 124 may respond by clicking on a "confirm" button. The open platform server 122 may then send a page including password entry interface to prompt the user to enter passwords for the user fund account (or a user bank account). Therefore, the payment information confirmation and authentication of the user identify are performed in two steps.

After obtaining confirmation and authentication response from the user client 124, the open platform server 122 then processes payment by withdrawing the payment amount from the user's fund account and by depositing the payment amount to a pooled application account in step 112. The pooled application account is opened at the open platform server 122 for collecting funds for a plurality of merchants that use the payment request receiving application 125 and the payment request receiving server 124 to communicate with the open platform server 124 for payment processing. After the fund is transferred from the user fund account to the pooled application account at the open platform server 122, the open platform server 122 sends a payment completion notification to the payment request receiving server 121 in step 123. The payment request receiving server 121 then sends a payment completion notification to the merchant client 123.

Referring to FIG. 3, an online payment processing method 200 may include the various steps described in connection with FIG. 2, with additional steps to enable the payment request receiving application 125 on the merchant client 123 and the steps to distribute fund from the pooled application account to the individual merchant bank accounts.

First, the merchant opens the payment request receiving application 125 on the merchant client 123 in step 201. The payment request receiving server 121 then determines whether a payment request receiving function has been enabled on the merchant client in step 202.

Upon installation of the payment request receiving application 125 on the merchant client 123, the merchant need to register a merchant account on the payment request receiving server 121 and to have the payment request receiving function enabled on the merchant client 123. If the payment request receiving function has been enabled, the payment request receiving page is opened and displayed on the merchant client 123 in step 203. If the payment request receiving application function is not enabled, the payment request receiving server 121 sends a response to the merchant client 123 asking the merchant to submit registration information and then the merchant sends registration information to the payment request receiving server in step 204.

The payment request receiving server 121 then verifies the merchant's registration information. If the merchant passes the verification, the payment request receiving function on the merchant client is enabled, the method 200 returns to step 201. If the merchant fails to pass the verification, the method 200 returns to step 204 to request registration information again.

The registration information requested in step 204 may include merchant information including, but not limited to, a company name, a name of a legal representative, a copy of a business license, and merchant bank account information to be used for receiving the payment from the user. The merchant information may be verified automatically by a computer by sending the merchant's bank account information to a banking system or manually by a network administrator.

When the merchant enables the payment request receiving function, the payment request receiving server 121 assigns a merchant account ID (application ID) and a merchant ID (partner id) to the merchant client, and stores the merchant account ID and a merchant ID in a backend server.

After the payment request receiving page is displayed on the merchant client in step 203, the merchant may enter the payment amount to send a payment request to the payment request receiving server in step 206. Step 206 is similar to step 101 described in connection with FIG. 2 and thus the detailed description thereof is omitted herein.

The merchant client 123 then generates a payment code in step 207. It is noted that there may be steps between step 206 and step 207 for transmitting the request from the payment request receiving server 121 to the open platform server 122, which in turns, return a URL link to the payment request receiving server 121 and then to the merchant client 123. These steps are similar to steps 102-104 and thus the detailed description thereof is omitted herein.

After the payment code for the payment URL is generated, the payment code is sent to the user client 124 and scanned by the user client 124. Scanning the payment code triggers a payment request to the open platform server 122, which in turn generates and sends a payment confirmation page to the user client 124 in step 209. The detailed operation of sending the payment code to the user client 124 until the payment confirmation page on the user client 124 is similar to steps 107 to 110 and thus the detailed description is omitted.

The user can enter passwords for authentication purposes in step 210 similar to step 111 described in connection with FIG. 2. The payment amount is then transferred from the user fund account to a pooled application account at the open platform server in step 211.

After the payment amount is transferred from the user fund account to the pooled application account at the open platform server 122, the payment amount can further be transferred to the merchant account at the payment request receiving server 121 in step 212. The pooled application account collects fund from a plurality of user fund accounts for a plurality of merchants. The plurality of merchants each have a merchant account at the payment request receiving server 121 and use the payment request receiving application 125 and the payment request receiving server 121 to communicate with the users and the open platform server 122. While only three merchant accounts are shown in FIG. 3, it is understood that any number of merchant accounts at the payment request receiving server 121 may share the same pooled application account at the open platform server 122.

The fund in a specific merchant account at the payment request receiving server 121 is then transferred to the specific merchant's bank account in step 213. The online payment processing is completed.

It is noted that FIG. 3 shows only the basic steps for the online payment processing method. Some steps shown in FIG. 2 but not shown in FIG. 3 are also applicable to the online payment processing method 200 of FIG. 3. For example, step 101 to step 104 described in connection with FIG. 2 may be repeated in FIG. 3.

It is also noted that in step 213, the payment request receiving server 121 may transfer the fund from the merchant account at the payment request receiving server 121 to the merchant's bank account within a prescribed period, for example, 5 workdays.

Alternatively, the payment request receiving server 121 may transfer all payment fund received for the same merchant at the merchant account to a merchant bank account on a regular basis, for example, at a designated date of a month, to reduce the number of money transfer between the merchant account at the payment request receiving server 121 to the merchant bank account. The payment request receiving server 121 may also generate and send to the merchant a statement of all fund received and the corresponding commodity identifiers. The payment request receiving server 121 may also analyze history statements of the merchant based on a built-in financial system model and generate and send a financial statement to the merchant client. Therefore, the merchant can have a record of the payment history and the transaction involved, thereby helping small or mid-sized merchants, who generally have no resources to purchase the relevant services, to understand their business.

Figure 4:
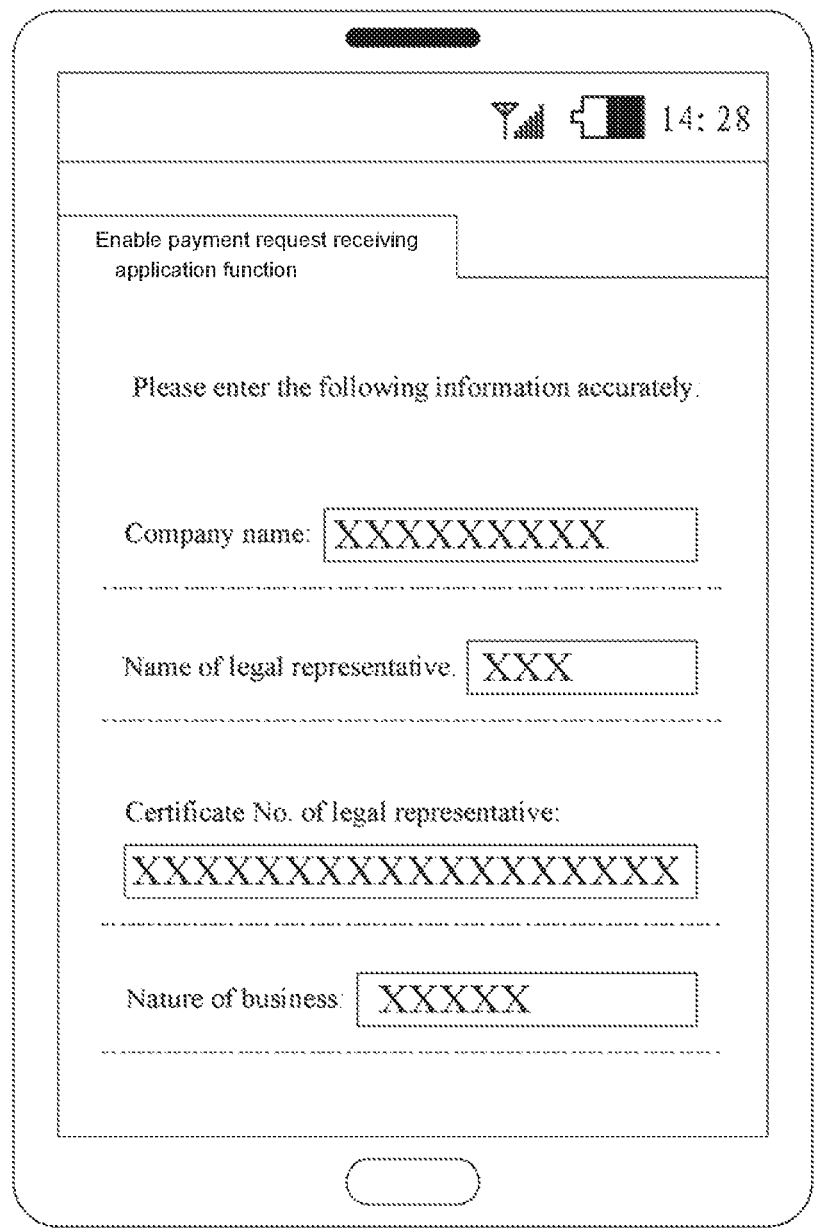
FIG. 4 is a schematic view of a web page displayed on a merchant client to obtain merchant information to enable a payment request receiving function according to an embodiment of the present invention.

Referring to FIG. 4, an exemplary display page on a merchant terminal for obtaining merchant information to open an account on a payment request receiving application is shown. The display page is a function enabling page including a plurality of boxes and input interfaces to allow the merchant to enter the required merchant information. For example, the function enabling page may include input boxes for entering the company name, the name of the legal representative, certificate number of legal representative and nature of business, among others.

Figure 5:
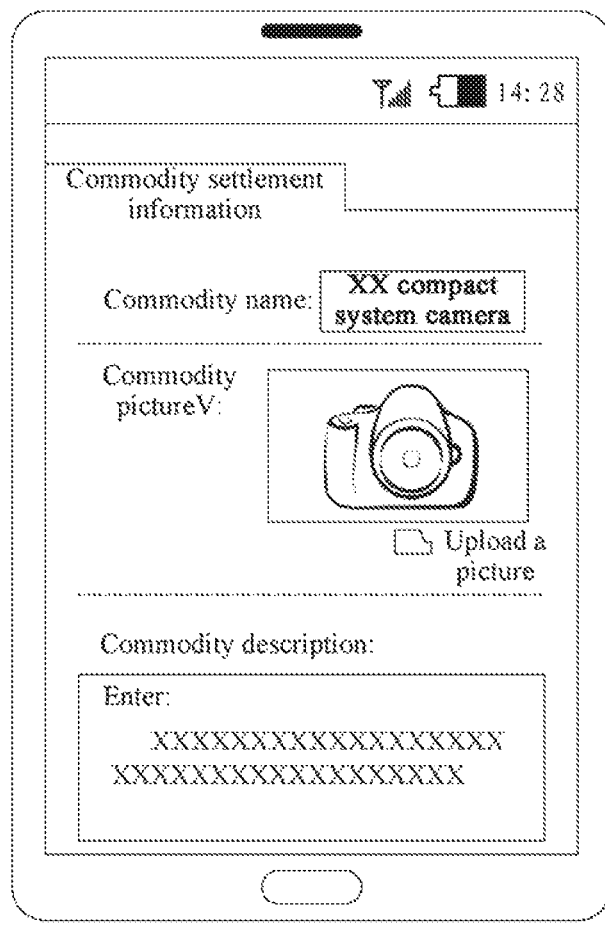
FIG. 5 is a schematic view of a web page displayed on a merchant client to enter payment information according to an embodiment of the present invention.
Figure 6A:
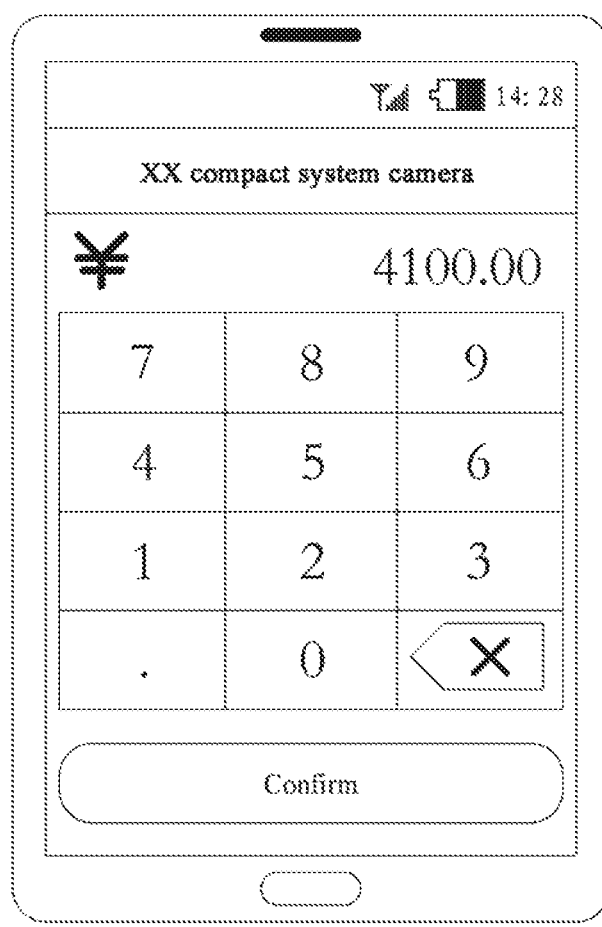
FIG. 6A is a schematic view of a web page displayed on a merchant client to enter payment amount according to an embodiment of the present invention.

Referring to FIGS. 5 and 6A, exemplary pages displayed on the merchant client are shown to include input interfaces for obtaining payment information and payment amount, respectively. After the merchant enters the description of the commodity on the page shown in FIG. 5, the payment request receiving server 121 returns a page shown in FIG. 6A to allow the merchant to enter the payment amount. The payment information to be entered by the merchant may include, but not be limited to, the commodity price and at least one of a commodity ID, a commodity discount, commodity bonus points, commodity description, currency used, and shipping charges.

Figure 6B:
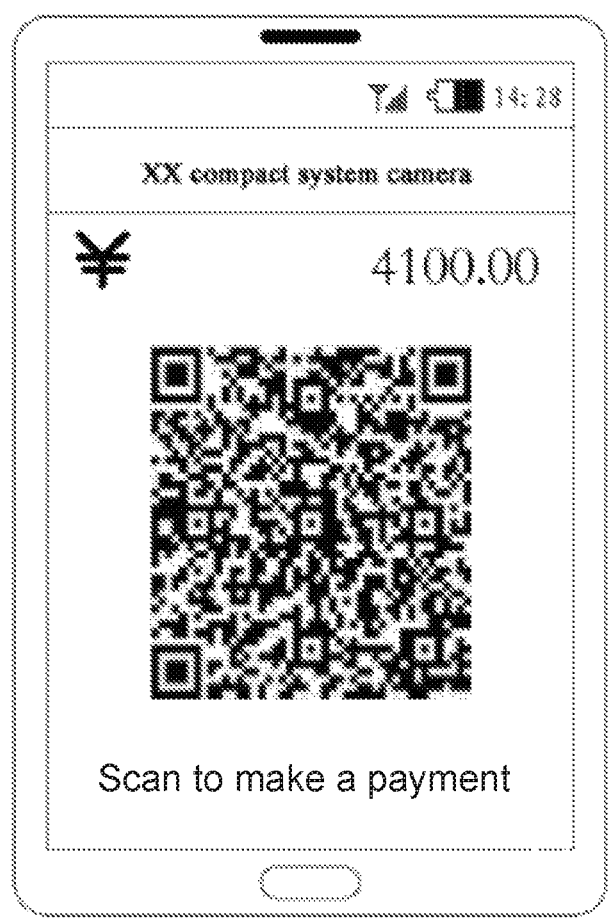
FIG. 6B is a schematic view of a page displayed on the merchant client after the merchant enters the payment amount and after the payment processing request is sent to the payment request receiving server.

After the merchant enters the payment amount to initiate a payment processing request, which causes the payment request receiving server 121 to send a payment URL request to the open platform server 122, the open platform server 122 returns the payment URL. Upon receipt of the payment URL, the merchant client 123 generates a payment code locally on the merchant client 123. FIG. 6B shows an exemplary payment code in the form of a two-dimensional bar code. By using the user client 124 to scan the payment code displayed on the merchant client 123, the user client 124 is linked to the payment URL and displays a payment confirmation page to the user.

Figure 7:
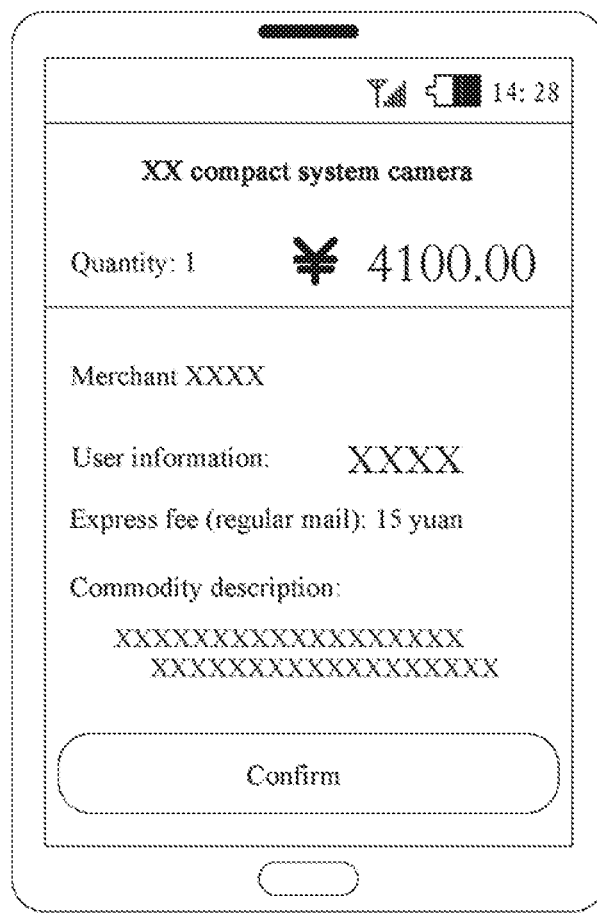
FIG. 7 is a schematic view of a payment confirmation page displayed on a user client according to an embodiment of the present invention.

Referring to FIG. 7, an exemplary payment confirmation page generated and sent by the open platform server 122 to the user client 124 is shown to include a merchant name, a commodity price, commodity descriptions, and shipping charges.

Figure 8:
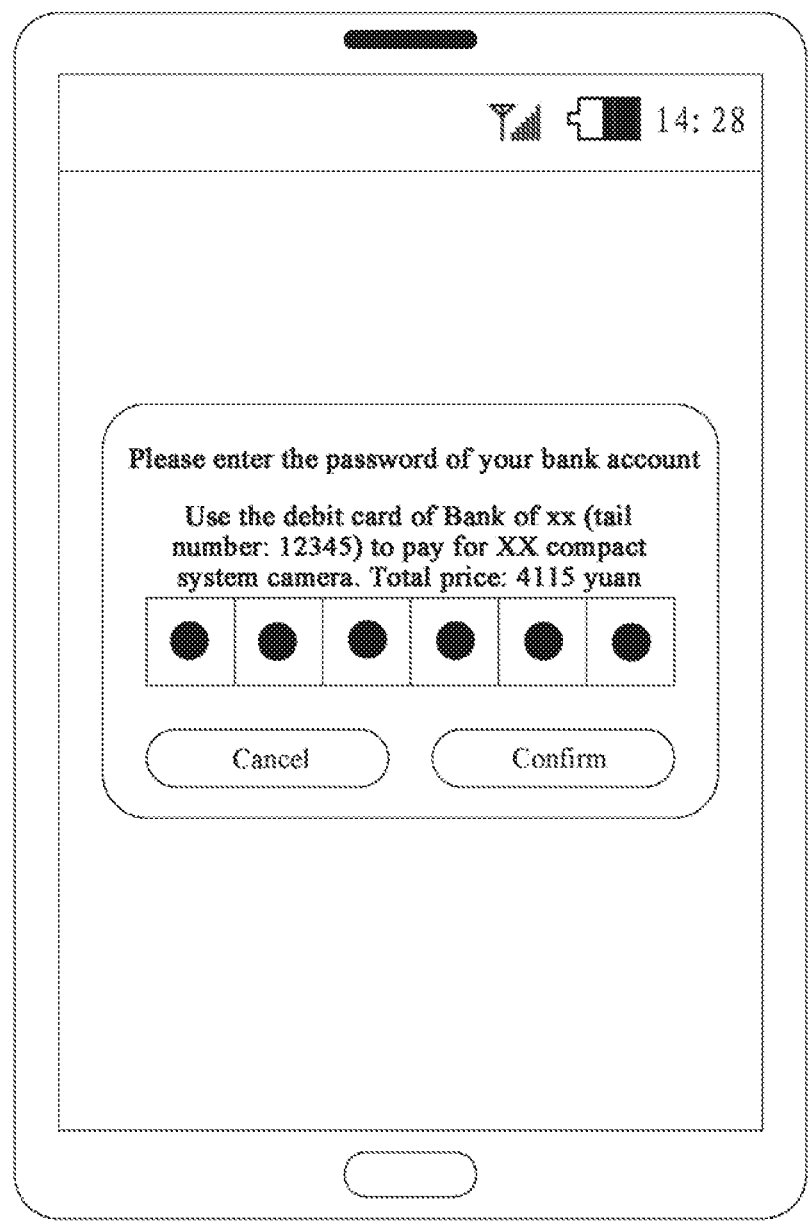
FIG. 8 is a schematic view of an authentication page displayed on a user terminal to obtain a password from the user according to an embodiment of the present invention.

Referring to FIG. 8, after the user confirms on the payment confirmation page and sends the response to the open platform server 122, the open platform server 122 sends an authentication page to the user client to obtain a password for the user fund account at the open platform server 122 or a password for a user bank account.

In another preferable solution of this embodiment, to ensure security of data transfer, before sending the payment information and merchant ID to the open platform server 123, the payment request receiving server 121 further signs and encrypts the payment information and the merchant ID by using a cipher key authenticated by the open platform server 122, and then sends the signed and encrypted payment information and merchant ID to the open platform server 122 by invoking the information return interface. The cipher key is negotiated by the payment request receiving server 121 and open platform server 122 in advance, and is saved in the backend of the payment request receiving server 121.

Compared with the prior art in which the payment processing information is signed and encrypted by the merchant side, this embodiment only saves the cipher key at the payment request receiving server side, and the merchant does not need to configure the backend server to save the cipher key, which makes it easier for merchants to participate in online payment processing while ensuring the security of information transfer.

Figure 9:
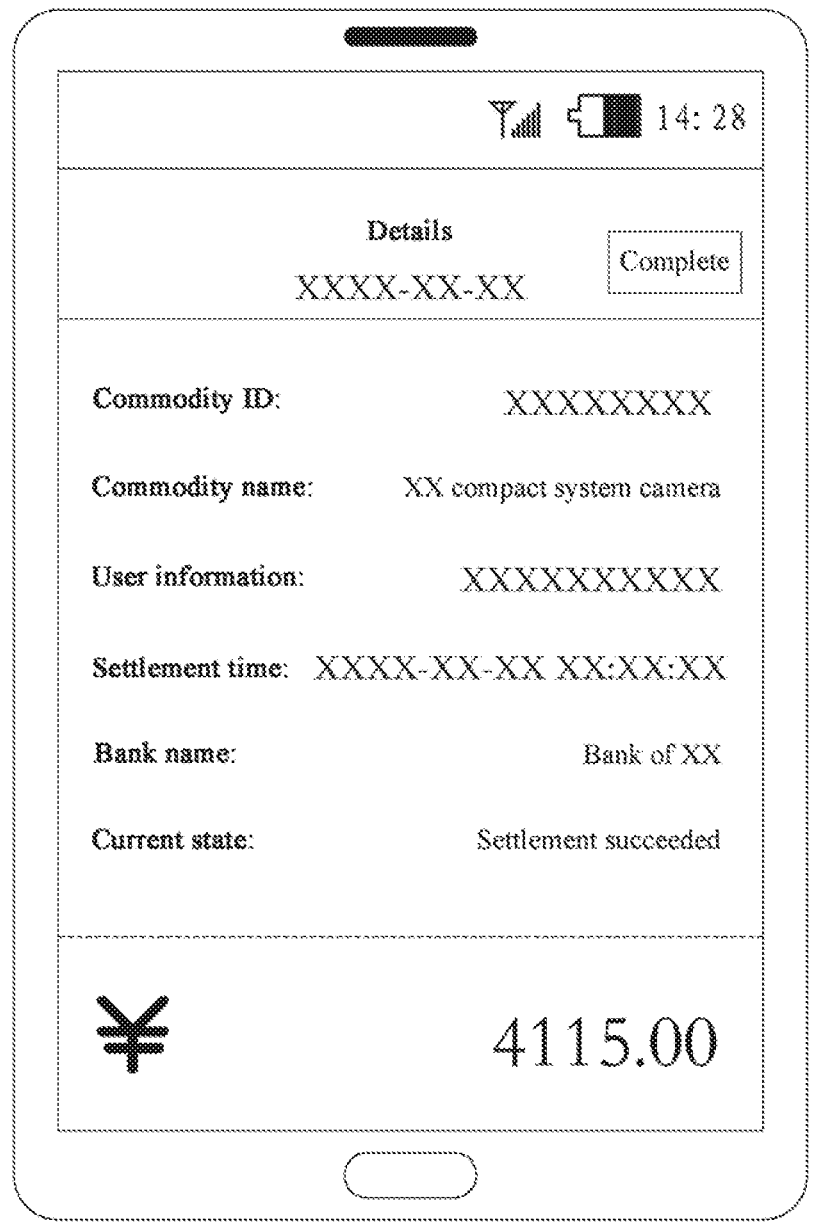
FIG. 9 is a schematic view of a notification page displayed on a merchant client notifying the merchant that payment processing is completed according to an embodiment of the present invention.

Referring to FIG. 9, an exemplary payment completion notification page is shown on the merchant client 123. The payment completion notification page is sent to the merchant client 123 when the open platform server 122 successfully transfers the payment amount from the user fund account or user bank account to the pooled application account at the open platform server 122.

Figure 10:
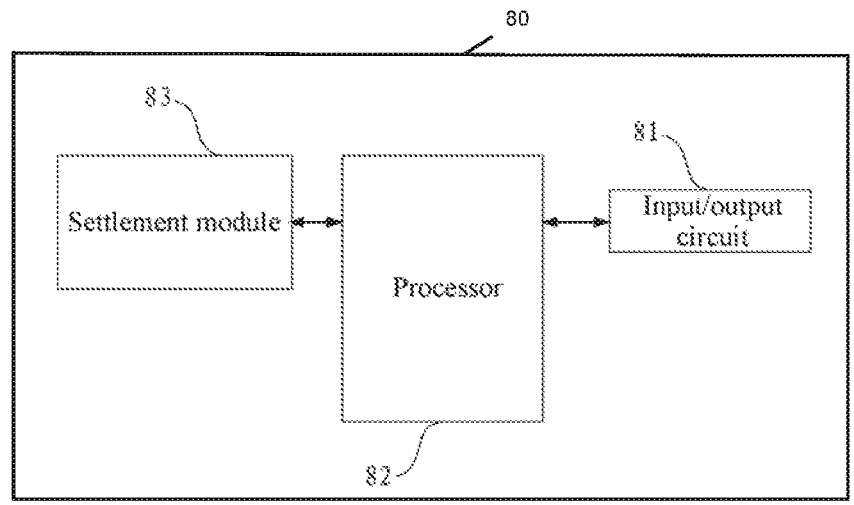
FIG. 10 is a schematic structural diagram of an online payment processing apparatus according to an embodiment of the present invention.

Referring to FIG. 10, an online payment processing apparatus 80 for implementing the method described in connection with FIG. 2 or FIGS. 3A and 3B according to another embodiment of the present disclosure include an input/output circuit 81, a processor 82, and a payment processing module 83. The apparatus 80 may be located inside the payment request receiving server 121 or at a payment request receiving server side. The input/output circuit 81 is configured to receive a payment processing request sent by a merchant client and send the payment processing information generated by the processor 82 to the merchant client. The processor 82 is configured to generate payment processing information according to the payment processing request received by the input/output circuit 81. The payment processing module 83 is configured to receive a fund deposited by the payment processing platform server and transfers the received fund to a fund account associated with the merchant client.

Figure 11:
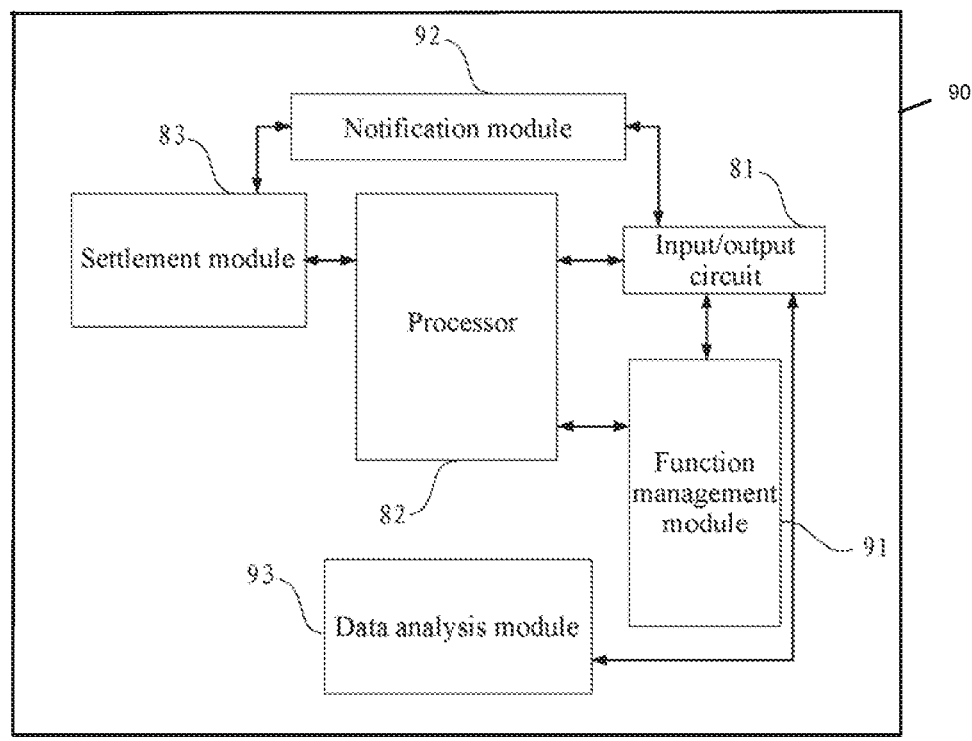
FIG. 11 is a schematic structural diagram of another online payment processing apparatus according to an embodiment of the present invention.

Referring to FIG. 11, an online payment processing apparatus 90 for implementing the method described in connection with FIG. 2 or FIG. 3 according to another embodiment of the present disclosure include an input/output circuit 81, a processor 82, and a payment processing module 83, a function management module 91, a notification module 92, and data analysis module 93. The input/output circuit 81, a processor 82, and a payment processing module 83 are similar to those of FIG. 10 and the description thereof is omitted.

The function management module 91 is configured for checking whether a payment request receiving application function is enabled on the merchant client before the processor 82 generates the payment information according to the payment processing request. The input/output circuit 81 is further used for obtaining merchant information from the merchant client when the function management module 91 determines that the payment request receiving application function is not enabled on the merchant client. The function management module 91 is further used for verifying the merchant information obtained by the input/output circuit 81. The function management module 91 is further used for enabling the payment request receiving application function for the merchant client and assigning a merchant ID when the verification succeeds.

The input/output circuit 81 is further used for sending an information input interface to the merchant client before the processor 82 generates the payment processing information according to the payment processing request. The input/output circuit 81 is further used for receiving payment information entered by a merchant in the information input interface, where the payment information includes a commodity amount and at least one piece of the following data information: a commodity ID, a commodity discount, commodity bonus points, commodity description information, a currency used, and logistics expense. The processor 82 is used for generating a URL linked to the payment processing data and the merchant ID.

The notification module 92 is configured for receiving a payment processing result sent by the open platform server after the payment processing module 83 receives the fund deposited by the open platform server, and for providing a notification query portal for the merchant client, and requesting the payment processing result from the open platform server according to a query instruction of the merchant client.

The input/output circuit 81 is further used for notifying, according to the payment processing result obtained by the notification module 92, the merchant client that payment processing is successful or failed. The data analysis module 93 is configured for recording payment processing data of the merchant client, and generating a financial analysis report according to history payment processing data of the merchant client. The input/output circuit 81 is further used for sending the financial analysis report generated by the data analysis module 93 to the merchant client.

Figure 12:
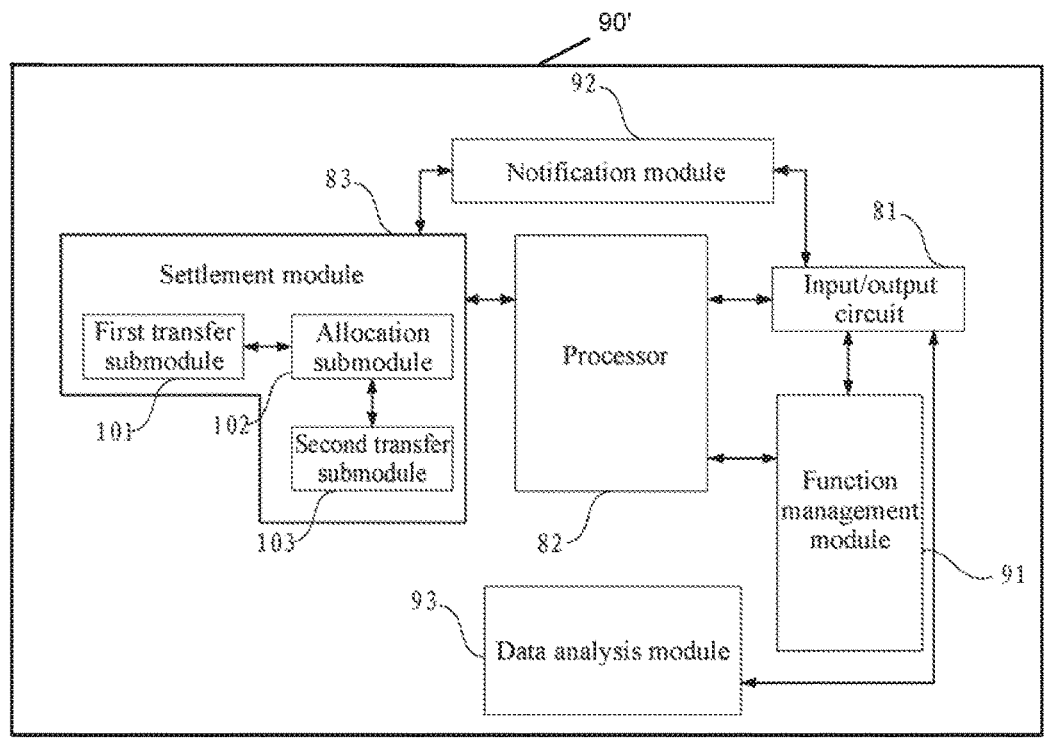
FIG. 12 is a schematic structural diagram of still another online payment processing apparatus according to an embodiment of the present invention.

Referring to FIG. 12, an online payment processing apparatus 90' according to the present disclosure is similar to that shown in FIG. 11, except that the payment processing module 83 further includes a first transfer submodule 101, an allocation submodule 102, and a second transfer submodule 103. The first transfer submodule 101 is configured to transfer the payment amount from a user fund account or a user bank account to the pooled application account at the open platform server 122. The allocation submodule 102 is configured to allocate the fund from the pooled application account to the merchant account at the payment request receiving server 121. The second transfer submodule 103 is used for transferring the fund allocated by the allocation submodule 102 from the merchant account at the payment request receiving server to a merchant's bank account within a prescribed period.

Figure 3A:
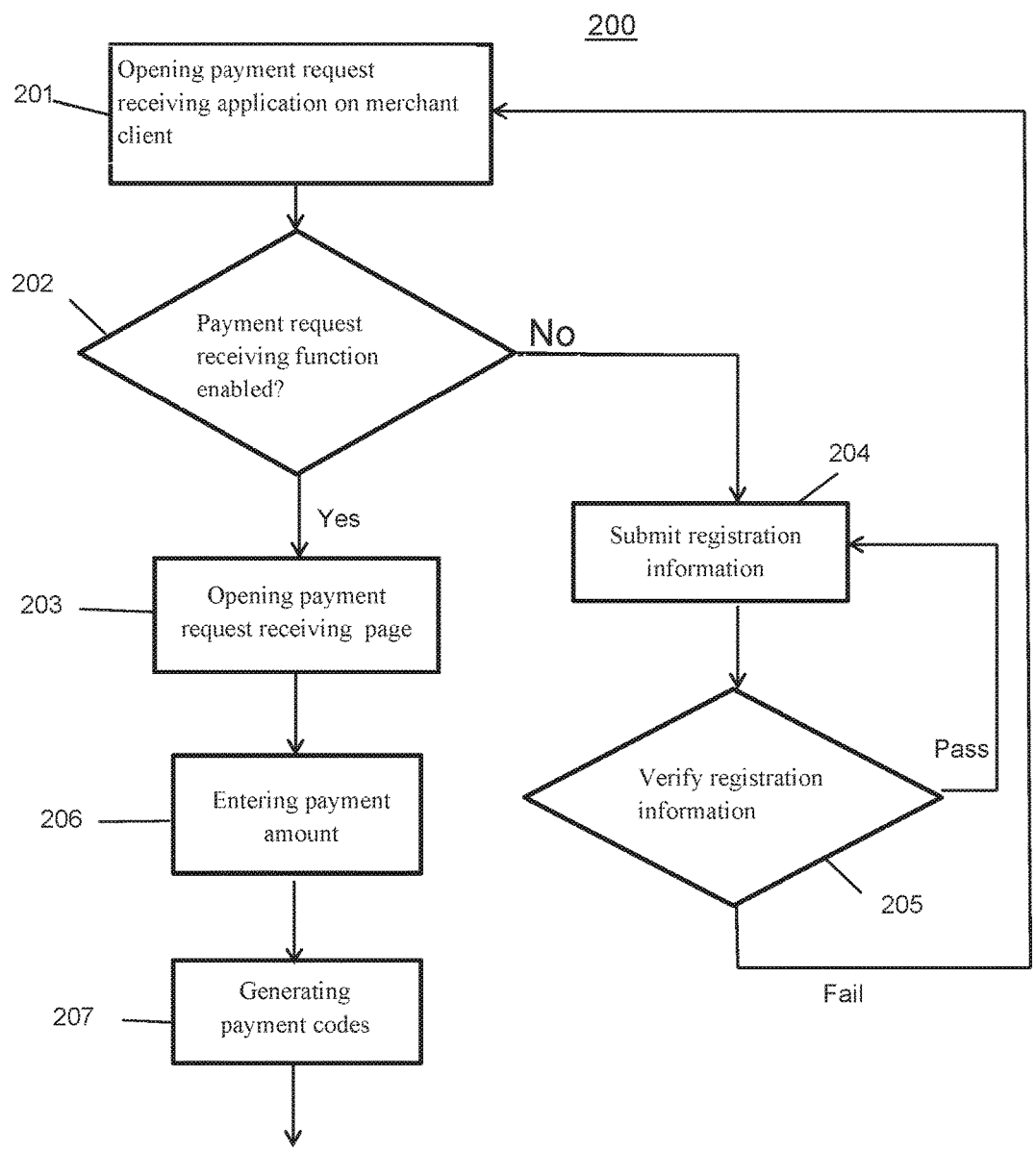
FIGS. 3A and 3B is a flowchart of an online payment processing method according to an embodiment of the present invention.
Figure 3B:
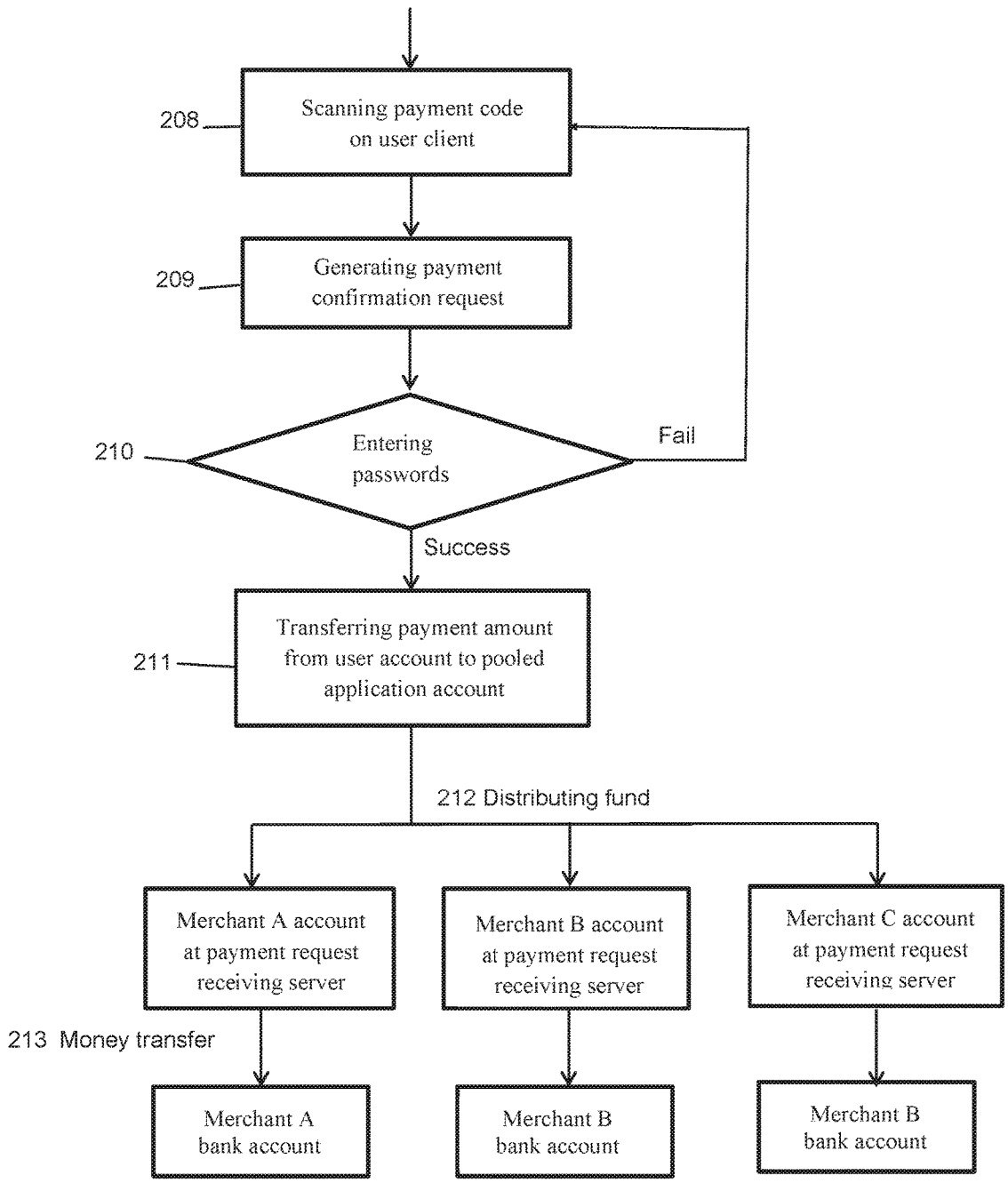
Figure 13:
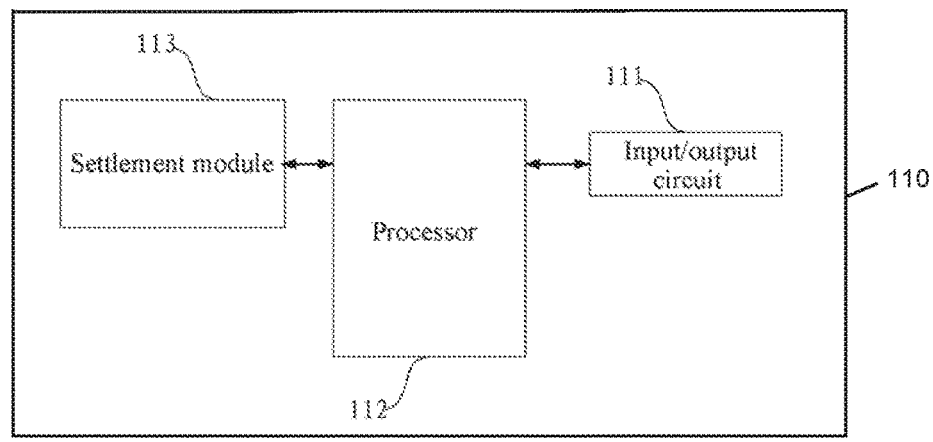
FIG. 13 is a schematic structural diagram of yet another online payment processing apparatus according to an embodiment of the present invention.

Referring to FIG. 13, an online payment processing apparatus 110 for implementing the method described in connection with FIG. 2 or FIGS. 3A and 3B is located inside the open platform server 122 or at an open platform server 122 side. The online payment processing apparatus 110 includes an input/output circuit 111, a processor 112, and a payment processing module 113. The input/output circuit 111 is used for receiving payment processing information sent by a user client. The processor 112 is used for generating a payment information confirmation page by associating the payment information received by the input/output circuit 111 and the user information of the user client. The input/output circuit 111 is further used for sending the payment information confirmation page generated by the processor 112 to the user client. The payment processing module 113 is used for transferring a fund from a user fund account or a user bank account to a pooled application account, according a confirming operation by the user. Further, the processor 112 is used for requesting the payment information and the merchant ID from the payment request receiving server according to a URL received by the input/output circuit 111, and generating the payment information confirmation according to the payment information, the merchant ID, and the user information. Further, the processor 112 is used for receiving the payment information and merchant ID that are signed and encrypted by the payment request receiving server.

The online payment processing apparatus, system and method described in any of the embodiments according to the present disclosure can complete the online payment processing process by using the independent payment request receiving server 121 and open platform server 122 as intermediaries between the merchant client 123 and the user client 124. The merchant side does not need to exchange information with the open platform server, and therefore does not need to develop interface protocols such as a native URL two-dimensional code generating interface and an information return interface.

In other words, the payment request receiving application 125 and the payment request receiving server 121 provide interface protocols to facilitate communication between the open platform server 122 and the merchant client 123. Therefore, the merchant client 121 can use the open platform server 122 to process a payment without establishing its own interface protocols and website, which are required by a typical online processing method. To complete the online payment processing process, the merchant only needs to send a payment processing request to the payment request receiving server 121 through a client/terminal and enter payment information. The online payment processing method according to the present application is particularly easy for the merchant to use.

In addition, the online payment processing apparatus, system and method described in any of the embodiments according to the present disclosure not only simplifies the architecture at the merchant side, but also implements third-party public storage and management for payment processing funds, thereby ensuring legitimate interests of merchants and users. Moreover, the online payment processing apparatus, system and method described in any of the embodiments according to the present disclosure provides a payment processing result notification for the merchant while the merchant side does not need to develop a payment processing notification interface protocol, so that the merchant can monitor the payment processing result in real time. Further, the online payment processing apparatus according to this embodiment can carry out financial analysis according to history statements of the merchant, thereby providing fast and professional financial services for the merchant. Finally, the online payment processing apparatus, system and method described in any of the embodiments according to the present disclosure signs and encrypts the payment information and merchant ID involved in the data transfer process while the merchant does not need to save and use a cipher key, which ensures the security of merchant data and user data.

Through the above description of the embodiments, it is apparent to persons skilled in the art that the present invention may be implemented by software on necessary universal hardware, and definitely may also be implemented by hardware, but in most cases, the present invention is preferably implemented in the former manner. Based on this, the technical solution of the present invention or the part that makes contributions to the prior art can be substantially embodied in the form of a software product. The computer software product may be stored in the readable storage media, for example, a floppy disk, hard disk, or optical disk of the computer, and contain several instructions adapted to instruct computer equipment (for example, a personal computer, a server, or network equipment) to perform the method according to the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. An online payment processing method, comprising:
in a network comprising a payment request receiving server, an open platform server, a plurality of merchant clients, and a plurality of user clients, wherein the plurality of merchant clients have respective merchant accounts registered with the payment request receiving server, and the plurality of user clients have respective user accounts registered with the open platform server, wherein the plurality of merchant clients communicate with the payment request receiving server through a first application installed on the plurality of merchant clients, and the plurality of user clients communicate with the open platform server through a second application installed on the plurality of user clients, and wherein the payment request receiving server and the open platform server communicate with each other during a payment transaction between a respective merchant client and a respective user client:
sending a payment processing request from a first merchant client to the payment request receiving server through a first merchant account of the first merchant client registered with the payment request receiving server, the payment processing request carrying payment information;
sending, in response to receiving the payment processing request through the first merchant account of the first merchant client registered with the payment request receiving server, a payment uniform resource locator (URL) request from the payment request receiving server to the open platform server;
generating a URL of a web page by the open platform server corresponding to the payment URL request received from the payment request receiving server, the web page comprising the payment information and merchant information corresponding to the first merchant account of the first merchant client;

sending the URL of the web page from the open platform server to the payment request receiving server, wherein the payment request receiving server forwards the URL of the webpage to the first merchant client;

generating, by the first merchant client, a payment code corresponding to the URL of the web page, wherein the payment code is configured to enable the open platform server to identify the URL of the webpage to locate the payment information and the merchant information corresponding to the payment processing request previously sent from the first merchant client to the payment request receiving server;

sending the payment code from the first merchant client to a first user client;

in response to receiving the payment code from the first merchant client:
    retrieving, by the first user client, the webpage containing the payment information and the merchant information from the open platform server in accordance with the payment code received from the first merchant client; and
    sending user information from the first user client to the open platform server via a first user account of the first user client registered with the open platform server;

processing payment by the open platform server based on the payment information obtained from the payment request receiving server and the user information obtained from the user client;

sending a password for a user fund account from the first user client to the open platform server;
    withdrawing a payment amount from the user fund account to a pooled application account at the open platform server; and
    sending a payment information confirmation page from the open platform to the first user client.

2. The method according to claim 1, wherein the sending of the payment code to the first user client is achieved by using the first user client to scan the payment code.

3. The method according to claim 1, wherein the payment code is a two-dimensional bar code.

4. The method according to claim 1, wherein the pooled application account includes fund collected for a plurality of merchants.

5. The method according to claim 1, further comprising transferring the payment amount from the pooled application account to the first merchant account at the payment request receiving server.

6. The method according to claim 5, further comprising transferring the payment amount from the first merchant account at the payment request receiving server to a merchant's bank account.

7. The method according to claim 1, further comprising installing the first application on the first merchant client, the first merchant client communicating with the open platform server through the payment request receiving application and the payment request receiving server.

* * * * *